(12) United States Patent
Sun

(10) Patent No.: US 8,918,628 B2
(45) Date of Patent: Dec. 23, 2014

(54) ELECTRONIC DEVICE AND METHOD FOR STARTING APPLICATIONS IN THE ELECTRONIC DEVICE

(75) Inventor: Jie Sun, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 416 days.

(21) Appl. No.: 13/310,714

(22) Filed: Dec. 3, 2011

(65) Prior Publication Data

US 2012/0221840 A1    Aug. 30, 2012

(30) Foreign Application Priority Data

Feb. 28, 2011 (CN) .......................... 2011 1 0047571

(51) Int. Cl.
*G06F 9/00* (2006.01)
*G06F 9/445* (2006.01)
*H04M 1/725* (2006.01)

(52) U.S. Cl.
CPC ........... *G06F 9/445* (2013.01); *H04M 1/72566* (2013.01); *H04M 1/72522* (2013.01)
USPC .................................................. 713/1; 713/2

(58) Field of Classification Search
USPC ........................................................ 713/1, 2
See application file for complete search history.

(56) References Cited

U.S. PATENT DOCUMENTS

| | | | | |
|---|---|---|---|---|
| 6,727,830 | B2 * | 4/2004 | Lui et al. | 341/20 |
| 2007/0028085 | A1 * | 2/2007 | Inohiza | 713/1 |
| 2009/0244833 | A1 * | 10/2009 | Imamura | 361/679.55 |
| 2010/0064341 | A1 * | 3/2010 | Aldera | 726/1 |
| 2012/0159112 | A1 * | 6/2012 | Tokusho et al. | 711/171 |

* cited by examiner

*Primary Examiner* — Dennis M Butler
*Assistant Examiner* — Alyaa T Mazyad
(74) *Attorney, Agent, or Firm* — Novak Druce Connolly Bove + Quigg LLP

(57) ABSTRACT

An electronic device sets run types and startup information for applications within the electronic device, where each run type is associated with a signal triggered by a hardware component of the electronic device and the startup information of each application comprises a run type and a starting time of the application. In response to detecting a signal triggered by a hardware component of the electronic device, and having an application having a run type associated with the signal, the electronic device further determines if a time of triggering the signal accords with a starting time of the application. The application is started if the time of triggering the signal accords with the starting time of the application.

15 Claims, 4 Drawing Sheets

ELECTRONIC DEVICE AND METHOD FOR STARTING APPLICATIONS IN THE ELECTRONIC DEVICE

BACKGROUND

1. Technical Field

The embodiments of the present disclosure relate to application software management systems and methods, and particularly to an electronic device and a method for starting applications in the electronic device.

2. Description of Related Art

Electronic devices, such as mobile phones, provide multiple applications that may be used by users. For example, a mobile phone may include applications such as a calendar, a phonebook, an album, a short messaging service, a music player, a search engine, instant messaging (IM), a navigation system, a social network service (SNS), for example. Applications may be started in the device by searching for a desired application by viewing a list of icons in a function menu, or by setting a hotkey for a favorite application, and pressing the hotkey to start the application.

However, either of the aforementioned two methods depends on an activation by a user to start an application. This manner for starting applications cannot satisfy demands of different users. For example, investors may want to browse stock news provided by a certain website when the electronic device is first powered on, and online game lovers may want to continue playing an online game that was being played previous to the electronic device being powered off. However, at present, every time the electronic device is powered on, it just goes into an idle mode.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
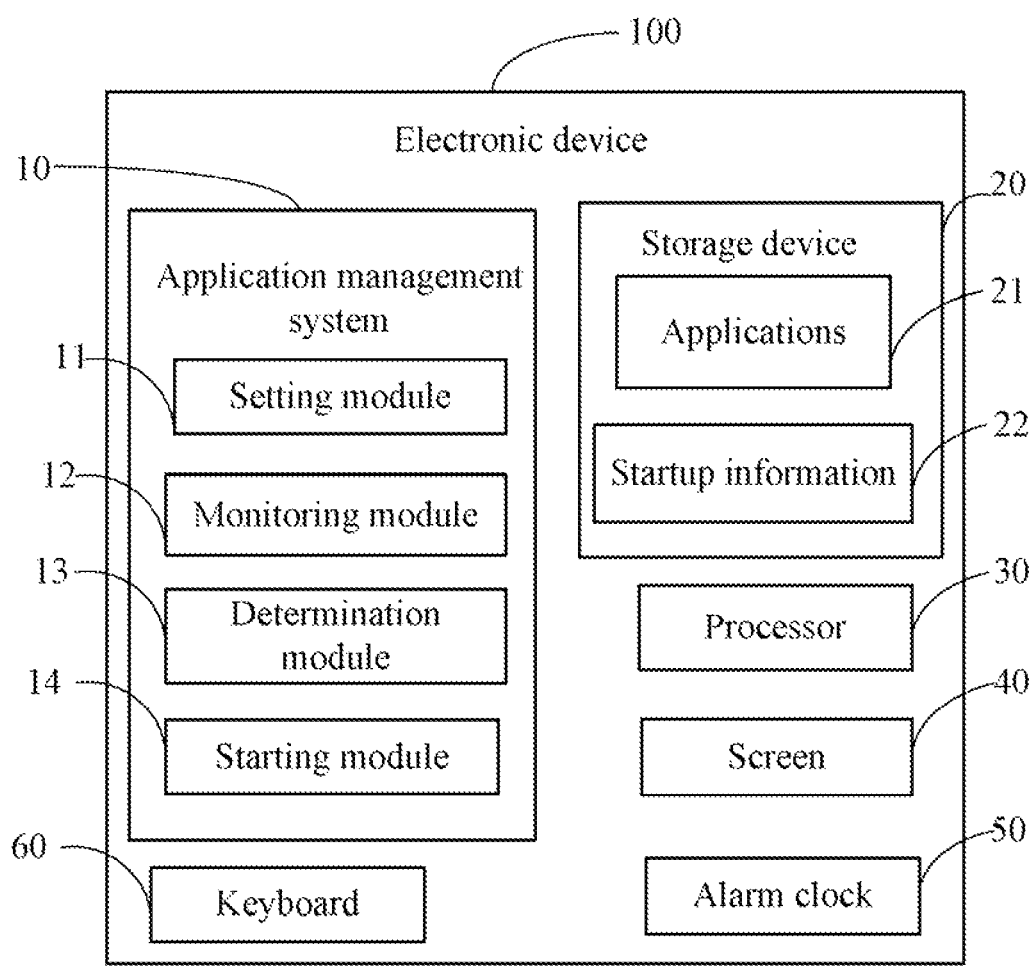
FIG. 1 is a block diagram of one embodiment of function modules of an electronic device comprising an application management system.

FIG. 1 is a block diagram of one embodiment of function modules of an electronic device 100. In one embodiment, the electronic device 100 includes an application management system 10, a storage device 20, a processor 30, a screen 40, an alarm clock 50, and a keyboard 60. Depending on the embodiment, the electronic device may be a portable computer, a personal digital assistant, or a smart phone, for example. One skilled in the art would recognize that the electronic device 100 may be configured in a number of other ways and may include other or different components. The application management system 10 sets different run types and startup information 22 for applications 21 installed in the electronic device 100, sets associations between signals triggered by hardware components of the electronic device 100 and running of the applications 21, and automatically starting an application 21 based on the startup information in response to detecting an associated signal.

As shown in FIG. 1, the application management system 10 includes a setting module 11, a monitoring module 12, a determination module 13, and a starting module 14. The modules 11-14 may include computerized code in the form of one or more programs that are stored in the storage device 20. The computerized code includes instructions to be executed by the processor 30 to provide aforementioned functions of the application management system 10. A detailed description of functions of the modules 11-14 is illustrated in FIG. 2.

In one embodiment, the storage device 20 further stores computerized code or data in relation to the applications 21 installed in the electronic device 100. For example, the applications 21 may include a calendar, a phonebook, an album, a short messaging service, a video player, a music player, a BLUETOOTH tool, a search engine, and a Web browser, for example. The storage device 20 may be a cache or a dedicated memory, such as an EPROM, HDD, or flash memory.

Figure 2:
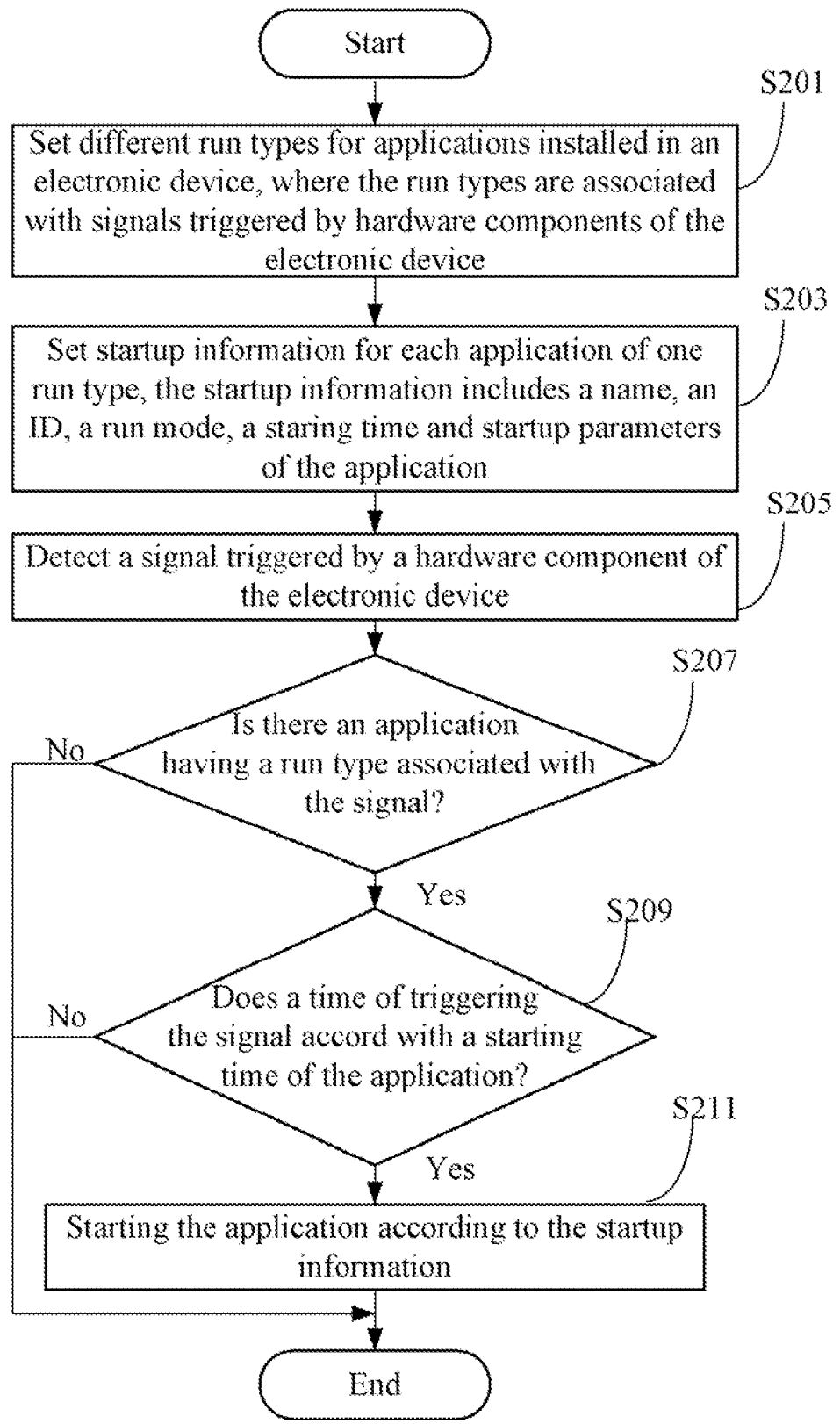
FIG. 2 is a flowchart of one embodiment of a method for starting applications in the electronic device of FIG. 1.

FIG. 2 is a flowchart of one embodiment of a method for starting applications in the electronic device 100. Depending on the embodiment, additional blocks may be added, others removed, and the ordering of the blocks may be changed.

Figure 3:
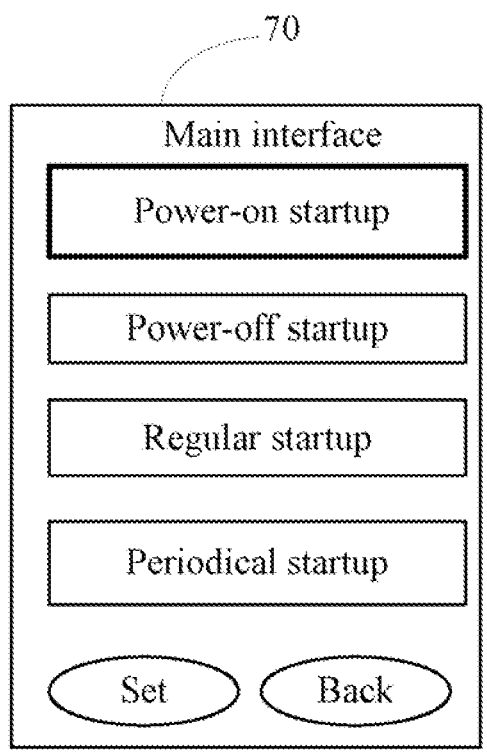
FIG. 3 and FIG. 4 are embodiments illustrate user interfaces provided by the application management system in FIG. 1.

In block S201, the setting module 11 sets different run types for the applications 21 installed in the electronic device 100, where each run type is associated with a signal triggered by a hardware component of the electronic device. In one embodiment, a run type of one application 21 is defined as a condition upon which the application 21 will be started. For example, if an application 21 has a run type of "power-on startup," it indicates that the application 21 will be started when the electronic device 100 is powered on. As shown in FIG. 3, the application management system 10 provides a main interface 70, which is displayed on the screen 40. As shown on the main interface 70, the run types include the "power-on startup" type, a "power-off startup" type, a "regular startup" type, and a "periodical startup" type. The type of "power-on startup" is associated with a power-on signal triggered by a power-on button of the keyboard 60. The type of "power-off startup" is associated with a power-off signal triggered by a power-off button of the keyboard 60. The types of "regular startup" and "periodical startup" are associated with alarm signals triggered by the alarm clock 50.

Figure 4:
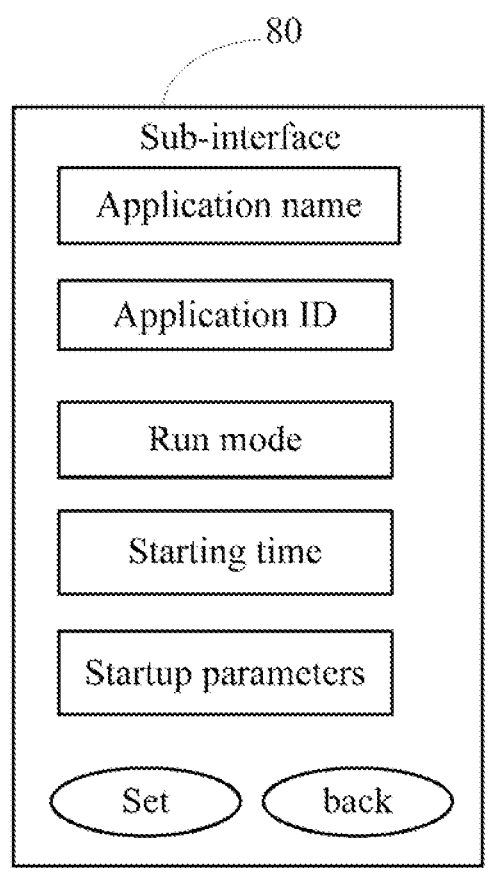

In block S203, the setting module 11 sets the startup information 22 for applications 21 that have the same run type. In one embodiment, in response to a run type displayed on the main interface and being selected by a user, such as the "power-on startup" highlighted in FIG. 3, as shown in FIG. 4, a sub-interface 80 is displayed for the user to set detailed startup information for the applications 21 with the selected run type. The startup information 22 includes a name of an application (hereinafter "the application name"), an identity of the application (hereinafter "the application ID"), a run mode, a staring time and startup parameters of each of the applications 21 that have the same run type. The run mode may be set as a digital number "1" which indicates running the application in the foreground of the electronic device 100, or set as a digital number "0" which indicates running the application in the background of the electronic device 100. The starting time may be set as "Null" which represents the application will be started in response that an associated signal is triggered at any time, or be set as a fixed time (such as 7:00 am) or a periodic condition (such as every 10 minutes) which represents the application will be started in response that the associated signal is triggered at particular time. If the starting time is set as the fixed time or the periodical condition, the setting module 11 sends the time data to the alarm clock 50 for timing.

The startup parameters depend on a type of the application. For example, if the application 21 is the BLUETOOTH tool, the startup parameters may be set as "Null". If the application is the media player, the startup parameters may be set as a name of an album. If the application is the Web browser, the startup parameters may be set as a wireless application protocol (WAP) address. The above-mentioned run types and startup information 22 of the applications 21 are stored into the storage device 20 by the setting module 11.

For example, if a video player is set as a power-on startup application. According to FIG. 4, the application name may be set as "video player", the application ID may be "005", the run mode may be set as "1", the starting time may be set as "Null", and the startup parameters may be set as a storage path of a video, such as "C:\video files\my family". For another example, if a media player is set as a power-off startup application, the application name may be set as "media player", the application ID may be "012", the run mode may be set as "1", the starting time may be set as "11:00 pm", and the startup parameters may be set as a storage path of a musical composition, such as "C:\music files\Beethoven<for Elise>".

In block S205, the monitoring module 12 detects a signal triggered by a hardware component of the electronic device 100. For example, the monitoring module 13 may detect a power-off signal triggered by the power-off button of the keyboard 60.

In block S207, the determination module 13 determines if there is an application 21 having a run type associated with the signal according to the startup information 22. If no application 21 has the run type associated with the signal, the procedure ends. Otherwise, if an application 21 (such as the media player) has the run type (such as the "power-off startup") associated with the signal (such as the power-off signal triggered by the power-off button of the keyboard 60), the procedure goes to block S209.

In block S209, the determination module 13 determines if a time of triggering the signal accords with the starting time of the application 21 according to the startup information 22. If the time of triggering the signal does not accord with the starting time of the application 21, the procedure ends. For example, as mentioned above, the starting time of the "media player" is set as "11:00 pm", if the power-off signal is triggered on 10:00 am, then the procedure ends. Otherwise, if the time of triggering the signal accords with the starting time of the application 21, for example, if the power-off signal is triggered on 11:00 pm, the procedure goes to block S211.

In block S211, the starting module 14 starts the application 21 according to the startup information 22. For example, the starting module 14 may start the "media player" according to the application name, the application ID, and the startup parameters.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being performed by execution of instructions by a processor of an electronic device for starting applications in the electronic device, the method comprising:
setting run types and startup information for the applications, wherein the run types are associated with signals triggered by hardware components of the electronic device and the startup information of each application comprises a run type and a starting time of the application, and the run types comprise a "power-on startup" type, a "power-off startup" type, a "regular startup" type, and a "periodical startup" type;
detecting a signal triggered by a hardware component of the electronic device;
in response to determination that an application having a run type is associated with the signal according to the startup information of all the applications, determining if a time of triggering the signal accords with a starting time of the application according to the startup information of the application; and
starting the application according to the startup information of the application in response that the time of triggering the signal accords with the starting time of the application.

2. The method of claim 1, wherein the signal triggered by the hardware component comprises a power-on signal triggered by a power-on button of a keyboard of the electronic device, a power-off signal triggered by a power-off button of the keyboard, and an alarm signal triggered by an alarm clock of the electronic device.

3. The method of claim 2, further comprising: sending data about the starting time to the alarm clock for timing if the starting time is not set as Null.

4. The method of claim 1, wherein the startup information of each application further comprises a name of the application, an identity of the application, a run mode of the application, and startup parameters of the application.

5. The method of claim 4, wherein the run mode indicates running the application in foreground or running the application in background of the electronic device.

6. A non-transitory medium storing a set of instructions, the set of instructions capable of being executed by a processor of an electronic device to perform a method for starting applications in the electronic device, the method comprising:
setting run types and startup information for the applications, wherein the run types are associated with signals triggered by hardware components of the electronic device and the startup information of each application comprises a run type and a starting time of the application, and the run types comprise a "power-on startup" type, a "power-off startup" type, a "regular startup" type, and a "periodical startup" type;
detecting a signal triggered by a hardware component of the electronic device;
in response to determination that an application having a run type is associated with the signal according to the startup information of all the applications, determining if a time of triggering the signal accords with a starting time of the application according to the startup information of the application; and
starting the application according to the startup information of the application in response that the time of triggering the signal accords with the starting time of the application.

7. The medium of claim 6, wherein the signal triggered by the hardware component comprise a power-on signal triggered by a power-on button of a keyboard of the electronic device, a power-off signal triggered by a power-off button of the keyboard, and an alarm signal triggered by an alarm clock of the electronic device.

8. The medium of claim 7, wherein the method further comprises: sending data about the starting time to the alarm clock for timing if the starting time is not set as Null.

9. The medium of claim 6, wherein the startup information of each application further comprises a name of the application, an identity of the application, a run mode of the application, and startup parameters of the application.

10. The medium of claim 9, wherein the run mode indicates running the application in foreground or running the application in background of the electronic device.

11. An electronic device, comprising:
a storage device;
a processor; and
one or more programs stored in the storage device and being executable by the processor, the one or more programs comprising instructions to:
set run types and startup information for the applications, wherein the run types are associated with signals triggered by hardware components of the electronic device and the startup information of each application comprises a run type and a starting time of the application, and the run types comprise a "power-on startup" type, a "power-off startup" type, a "regular startup" type, and a "periodical startup" type;
detect a signal triggered by a hardware component of the electronic device;
in response to determination that an application having a run type is associated with the signal according to the startup information of all the applications, determine if a time of triggering the signal accords with a starting time of the application according to the startup information of the application; and
start the application according to the startup information of the application in response that the time of triggering the signal accords with the starting time of the application.

12. The device of claim 11, wherein the signal triggered by the hardware component comprise a power-on signal triggered by a power-on button of a keyboard of the electronic device, a power-off signal triggered by a power-off button of the keyboard, and an alarm signal triggered by an alarm clock of the electronic device.

13. The device of claim 12, wherein the one or more programs further comprises instructions to: send data about the starting time to the alarm clock for timing if the starting time is not set as Null.

14. The device of claim 11, wherein the startup information of each application further comprises a name of the application, an identity of the application, a run mode of the application, and startup parameters of the application.

15. The device of claim 14, wherein the run mode indicates running the application in foreground or running the application in background of the electronic device.

* * * * *